(12) United States Patent
Gkoulalas-Divanis et al.

(10) Patent No.: US 10,831,928 B2
(45) Date of Patent: Nov. 10, 2020

(54) DATA DE-IDENTIFICATION WITH MINIMAL DATA DISTORTION

(71) Applicant: International Business Machines Corporation, Armonk, NY (US)

(72) Inventors: Aris Gkoulalas-Divanis, Waltham, MA (US); Corville O. Allen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 15/995,388

(22) Filed: Jun. 1, 2018

(65) Prior Publication Data
US 2019/0370497 A1    Dec. 5, 2019

(51) Int. Cl.
*G06F 21/62*        (2013.01)
*G06K 9/62*         (2006.01)

(52) U.S. Cl.
CPC ......... *G06F 21/6254* (2013.01); *G06K 9/623* (2013.01); *G06K 9/6232* (2013.01)

(58) Field of Classification Search
CPC .. G06F 21/6254; G06K 9/6232; G06K 9/623; G06K 9/6298
See application file for complete search history.

(56) References Cited

U.S. PATENT DOCUMENTS

| | | | |
|---|---|---|---|
| 7,885,941 B2 | 2/2011 | Aggarwal et al. | |
| 8,171,032 B2 * | 5/2012 | Herz | G06Q 30/02 707/748 |
| 8,326,849 B2 | 12/2012 | El Emam et al. | |
| 9,047,488 B2 | 6/2015 | Allen et al. | |
| 9,202,078 B2 | 12/2015 | Abuelsaad et al. | |
| 9,230,132 B2 | 1/2016 | Gkoulalas-Divanis et al. | |
| 9,589,151 B2 | 3/2017 | Deleeuw et al. | |
| 9,665,722 B2 | 5/2017 | Nagasundaram et al. | |

(Continued)

FOREIGN PATENT DOCUMENTS

| | | |
|---|---|---|
| CN | 105160266 A | 12/2015 |
| EP | 2228735 A2 | 9/2010 |

OTHER PUBLICATIONS

Yahalom, Ran et al. "Constrained Anonymization of Production Data: A Constraint Satisfaction Problem Approach." Secure Data Management (2010) 13 pages. (Year: 2010).*

(Continued)

*Primary Examiner* — Michael Pyzocha
(74) *Attorney, Agent, or Firm* — Will Stock; Edell, Shapiro & Finnan, LLC

(57) ABSTRACT

Methods and systems privatize a dataset while controlling discoverability of patterns of the dataset. In an embodiment, values are assigned to discoverable patterns of a dataset. Privacy constraints are determined to privatize the dataset. Pattern constraints are determined to preserve a first set of patterns of the dataset and to conceal a second set of patterns of the dataset. A model is generated to satisfy all of the privacy constraints and a subset of the pattern constraints that do not conflict with the privacy constraints, with minimal loss of data. The dataset is modified based on the model. Discoverable patterns of the modified database are determined from the subset of privacy constraints. And a monetary value of the modified dataset is determined based on the patterns that remain discoverable in the modified dataset.

20 Claims, 12 Drawing Sheets

(56) References Cited

U.S. PATENT DOCUMENTS

| | | | |
|---|---|---|---|
| 9,697,469 B2 | 7/2017 | McMahon et al. | |
| 9,785,792 B2 | 10/2017 | Barrett et al. | |
| 10,565,399 B2 | 2/2020 | Huang | |
| 2008/0040346 A1 | 2/2008 | Aggarwal et al. | |
| 2009/0030778 A1 | 1/2009 | Zapata et al. | |
| 2009/0303237 A1* | 12/2009 | Liu | H04L 63/0414 |
| | | | 345/440 |
| 2010/0332537 A1 | 12/2010 | El Emam et al. | |
| 2012/0303616 A1 | 11/2012 | Abuelsaad et al. | |
| 2014/0040134 A1* | 2/2014 | Ciurea | G06Q 20/383 |
| | | | 705/44 |
| 2014/0237620 A1* | 8/2014 | Ukil | G06F 21/60 |
| | | | 726/26 |
| 2014/0351946 A1* | 11/2014 | Oikawa | G16H 10/60 |
| | | | 726/26 |
| 2014/0380489 A1 | 12/2014 | Hacid et al. | |
| 2015/0186653 A1 | 7/2015 | Gkoulalas-Divanis et al. | |
| 2015/0213175 A1* | 7/2015 | Arai | G06F 30/39 |
| | | | 716/55 |
| 2015/0350844 A1* | 12/2015 | Agarwal | H04W 4/029 |
| | | | 455/456.2 |
| 2016/0012252 A1 | 1/2016 | Deleeuw et al. | |
| 2016/0154978 A1 | 6/2016 | Baker et al. | |
| 2016/0306999 A1 | 10/2016 | Beinhauer et al. | |
| 2017/0083708 A1* | 3/2017 | Braghin | G06F 16/2365 |
| 2017/0243028 A1 | 8/2017 | Lafever et al. | |
| 2017/0255790 A1 | 9/2017 | Barrett et al. | |
| 2017/0329991 A1* | 11/2017 | Van Dyne | G06F 21/6245 |
| 2018/0219842 A1* | 8/2018 | Bellala | H04L 63/061 |
| 2019/0102811 A1* | 4/2019 | Gupta | G06Q 30/0283 |
| 2019/0114447 A1* | 4/2019 | Kuo | G06F 21/6254 |
| 2019/0236309 A1* | 8/2019 | Gkoulalas-Divanis | |
| | | | G06F 21/6254 |

OTHER PUBLICATIONS

Dewri, R. et al.; "Using Multi-objective Optimization to Analyze Data Utility and Privacy Tradeoffs in Anonymized Techniques"; https://pdfs.semanticscholarorg . . . ; 2008, pp. 1-38.

Emam, KE.; "Heuristics for De-identifying Health Data"; https://ieeexplore.ieee.org/document/45882321/pdf.; 2008, pp. 58-61.

Anonymously; "Deep Generative Models Using Manifold Learning"; http://ip.com/IPCOM/000251126D; Oct. 17, 2017, 8 pages.

Anonymously; "Automated Discovery and Masking of Sensitive Data"; http://ip.com/IPCOM/000240280D; Jan. 21, 2015, 6 pages.

Anonymously; "Provider Based Access Control to Reconciled Data"; http://ip.com/IPCOM/000238992D; Sep. 30, 2018, 8 pages.

List of IBM Patents or Patent Applications Treated as Related, Jun. 2018, 1 page.

* cited by examiner

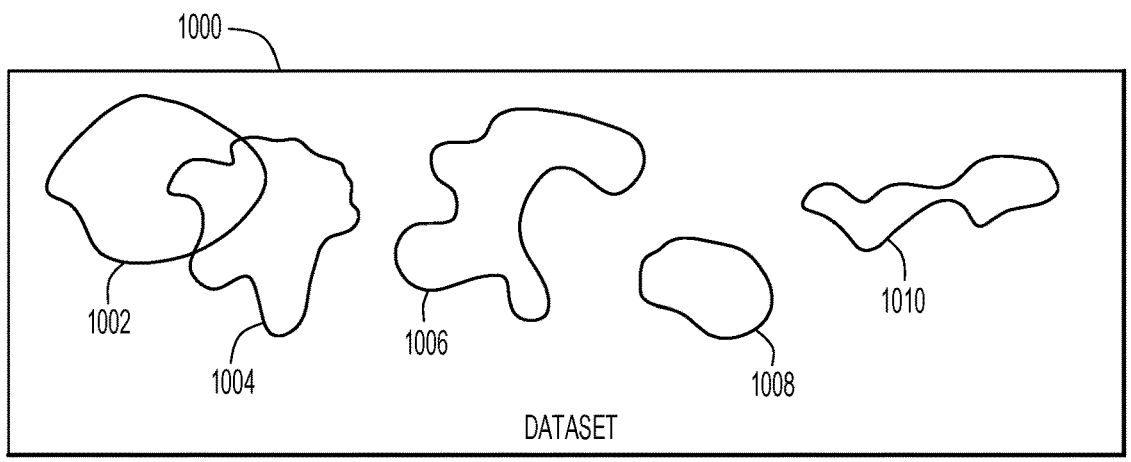
FIG.10
| PATTERN ID | RANK | VALUE | CONCEAL OR PRESERVE? | EXPECTED VALUE | CONCEAL OR PRESERVED? | ACTUAL VALUE |
|---|---|---|---|---|---|---|
| 1002 | 5 | $75 | PRESERVE | $75 | PRESERVED | $75 |
| 1004 | 4 | $100 | PRESERVE | $100 | CONCEALED | $0 |
| 1006 | 3 | $200 | PRESERVE | $200 | PRESERVED | $200 |
| 1008 | 1 | $300 | CONCEAL | $0 | CONCEALED | $0 |
| 1010 | 2 | $250 | CONCEAL | $0 | CONCEALED | $0 |
| TOTAL | | $925 | | $375 | | $275 |
FIG.11
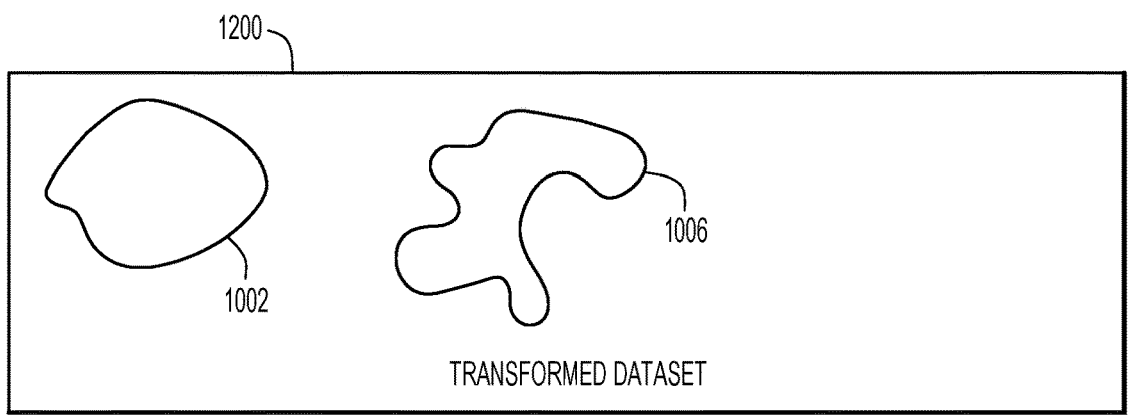
FIG.12

| PATTERN ID | RANK | VALUE | CONCEAL OR PRESERVE? | EXPECTED VALUE | CONCEAL OR PRESERVED? | ACTUAL VALUE |
|---|---|---|---|---|---|---|
| 1002 | 5 | $75 | PRESERVE | $75 | PRESERVED | $75 |
| 1004 | 4 | $100 | PRESERVE | $100 | PRESERVED | $100 |
| 1006 | 3 | $200 | PRESERVE | $200 | PRESERVED | $200 |
| 1008 | 1 | $300 | CONCEAL | $0 | CONCEALED | $0 |
| 1010 | 2 | $250 | CONCEAL | $0 | PRESERVED | $250 |
| TOTAL | | $925 | | $375 | | $625 |

DATA DE-IDENTIFICATION WITH MINIMAL DATA DISTORTION

BACKGROUND

Technical Field

The present disclosure relates to data mining, and more specifically, to controlling discoverability of knowledge patterns within an anonymized dataset.

Discussion of Related Art

A dataset may support multiple detectable knowledge patterns, or relationships amongst data, which may be useful to researchers, government agencies, and/or others.

A dataset may contain personal and/or sensitive data that an entity may have to privatize (i.e., anonymize or de-identify) before disclosing the dataset to another entity or individual.

The entity may also want to hide or conceal a subset of the patterns before disclosing the dataset to another entity or individual. Pattern hiding allows preserving secrecy of sensitive information that could otherwise provide competitive advantage to a business and may include omitting data from the database to render the subset of sensitive knowledge patterns undetectable.

If the subset of patterns is hidden after privatization, the dataset may no longer adhere to privatization requirements, such as no longer support a privacy model like k-anonymity, l-diversity, etc., due to transformations performed by a pattern hiding algorithm.

If the subset of patterns is concealed before privatization, privatization may inadvertently re-instate a concealed sensitive pattern and/or inadvertently conceal another, non-sensitive pattern(s) of the database.

SUMMARY

In an embodiment, values are assigned to discoverable patterns of a dataset. Privacy constraints are determined to privatize the dataset. Pattern constraints are determined to preserve a first set of patterns of the dataset and to conceal a second set of patterns of the dataset. A model is generated to satisfy all of the privacy constraints and a subset of the pattern constraints that do not conflict with the privacy constraints, with minimal loss of data. The model is applied to the dataset to determine changes needed to the dataset to satisfy all of the privacy constraints and the subset of the pattern constraints. The dataset is modified in accordance with the determined changes. Discoverable patterns of the modified database are determined from the subset of privacy constraints. And a monetary value of the modified dataset is determined based on the values of the patterns that remain discoverable in the modified dataset.

BRIEF DESCRIPTION OF THE DRAWINGS

Generally, like reference numerals in the various figures are utilized to designate like components.

FIG. 10 depicts an example dataset that includes discoverable data patterns 1002, 1004, 1006, 1008, and 1010 (e.g., 902 of method 900).

FIG. 11 depicts a table in which the discoverable patterns of FIG. 10 are ranked and valued.

FIG. 12 depicts an example transformed dataset in which a subset of patterns of FIG. 10 remain discoverable according to the table of FIG. 11.

DETAILED DESCRIPTION

Disclosed herein are methods and systems to privatize a dataset while controlling discoverability of patterns of the dataset, and associating a price to the modified dataset based on patterns that remain discoverable.

The term "privatize," as used here may include, without limitation, data de-identification and/or data anonymization technologies for privacy protection. Data anonymization irreversibly conceals the identities of individuals whose information is recorded in a dataset to prevent subsequent re-identification of the individuals under any condition. De-identification removes or obscures personally identifiable information from data (e.g., medical records), in a way that minimizes risks of unintended disclosure of the identity of individuals and information about them. Unlike anonymization, de-identification technologies may preserve some identifying information in a dataset to permit re-linking data to a source of data (e.g., by a trusted party in certain situations).

Data may be de-identified or anonymized based on contractual and/or legislative requirements. For example, the U.S. Health Insurance Portability and Accountability Act of 1996 (HIPAA; Pub.L. 104-191, 110 Stat. 1936), provides a list of types of safe harbor identifiers that, if removed from records, would constitute de-identification. Another example is new EU General Data Protection Regulation (GDPR), agreed by the European Parliament and Council in April 2016, which comes into existence on May 2018 as the primary law regulating how companies protect EU citizens' personal data. GDPR provides a list of identifiers that need to be concealed from data, along with reference to technologies for data pseudonymization and anonymization. In addition to the various worldwide legal frameworks, formal privacy models such as k-anonymity, l-diversity, and differential privacy, have been proposed to de-identify personal data while providing privacy guarantees on the level of protection that is achieved.

Figure 1:
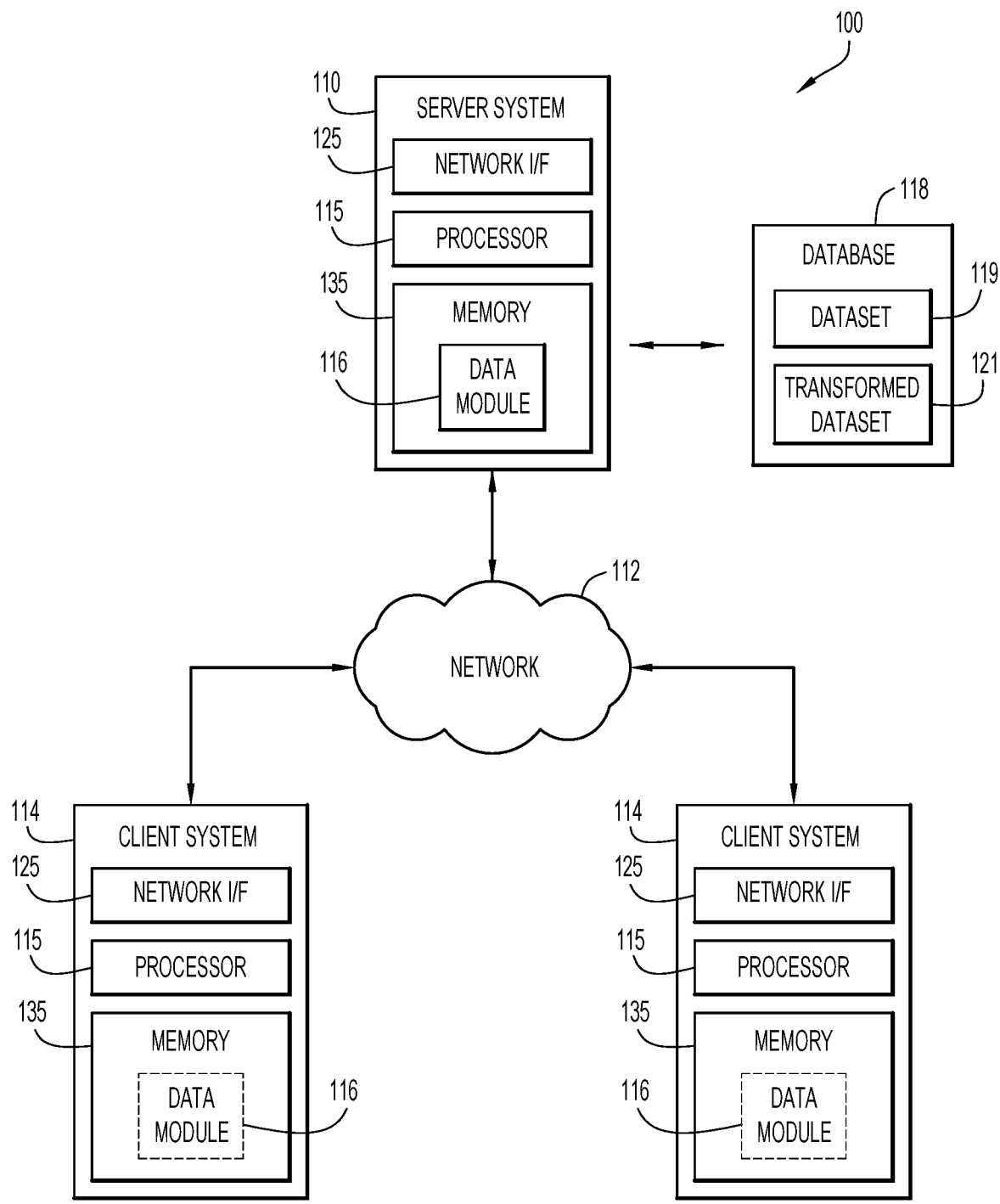
FIG. 1 illustrates an example environment in which techniques disclosed herein may be implemented or configured, according to an embodiment of the present invention.

FIG. 1 illustrates an example environment 100 in which techniques disclosed herein may be implemented or configured.

Environment 100 includes one or more server systems 110, and one or more client or end-user systems 114. Server systems 110 and client systems 114 may be remote from each other and communicate over a network 112. The network may be implemented by any number of any suitable communications media (e.g., wide area network (WAN), local area network (LAN), Internet, Intranet, etc.). Alternatively, server systems 110 and client systems 114 may be local to each other, and communicate via any appropriate local communication medium (e.g., local area network (LAN), hardwire, wireless link, Intranet, etc.).

Client systems 114 may be configured to perform local functions (i.e., within the respective client system 114), and/or to interact with other client systems 114 and/or server systems 110, such as to send and/or receive data and/or instructions.

Server systems 110 include a data module 116 to privatize a dataset 119 while controlling discoverability of patterns of dataset 119. Data module 116 may be configured to construct and solve a constraint satisfaction problem (CSP), to provide a transformed dataset 121, such as described in one or more examples herein.

A database system 118 may store various information for the analysis. The database system may be implemented by any conventional or other database or storage unit, may be local to or remote from server systems 110 and client systems 114, and may communicate via any appropriate communication medium (e.g., local area network (LAN), wide area network (WAN), Internet, hardwire, wireless link, Intranet, etc.). Client systems 114 may present a graphical user (e.g., GUI, etc.) or other interface (e.g., command line prompts, menu screens, etc.), to elicit information from users pertaining to a desired task.

Server systems 110 and client systems 114 may be implemented by any conventional or other computer systems preferably equipped with a display or monitor, a base (e.g., including at least one hardware processor 115 (e.g., microprocessor, controller, central processing unit (CPU), etc.), one or more memories 135 and/or internal or external network interfaces or communications devices 125 (e.g., modem, network cards, etc.)), optional input devices (e.g., a keyboard, mouse or other input device), and any commercially available and custom software (e.g., server/communications software, data module, browser/interface software, etc.).

Alternatively, one or more client systems 114 may be configured to operate in a stand-alone mode. In the stand-alone mode of operation, a client system 114 stores or has access to data (e.g., database 118), and includes a data module 116 to privatize dataset 119 while controlling discoverability of patterns of dataset 119.

The graphical user (e.g., GUI, etc.) or other interface (e.g., command line prompts, menu screens, etc.), may be configured to solicit information from a user pertaining to privatization, pattern hiding, pattern preservation, pattern prioritization, and/or pattern valuation.

Data module 116 may include one or more modules or units to perform various functions disclosed herein. The various modules may be implemented by any combination of any quantity of software (i.e., a computer program product), and/or hardware modules or units, and may reside within memory 135 of the server and/or client systems for execution by processor 115.

It will be appreciated that the embodiments described herein and illustrated in the drawings represent only a few of the many ways of privatizing a dataset while controlling discoverability of patterns of the dataset.

Environment 100 may include any number of computer or other processing systems (e.g., client or end-user systems, server systems, etc.) and databases or other repositories arranged in any desired fashion, where techniques disclosed herein may be applied to any desired type of computing environment (e.g., cloud computing, client-server, network computing, mainframe, stand-alone systems, etc.).

The computer or other processing systems employed may be implemented by any number of any personal or other type of computer or processing system (e.g., desktop, laptop, PDA, mobile devices, etc.), and may include any commercially available operating system and any combination of commercially available and custom software (e.g., browser software, communications software, server software, data privatization software, pattern hiding software, and/or pattern preservation software). These systems may include any types of monitors and input devices (e.g., keyboard, mouse, voice recognition, etc.) to enter and/or view information.

It is to be understood that a computer program to privatize a dataset while controlling discoverability of patterns of the dataset, such as described in one or more examples herein, may be implemented in any desired computer language by one of ordinary skill in computer arts based on the descriptions provided herein and the drawings. Further, any references herein of a computer program performing various functions generally refer to computer systems or processors performing those functions based on instructions contained in the computer program. The computer systems may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, functions may be distributed in any manner among the various end-user/client and server systems, and/or any other intermediary processing devices. Techniques disclosed herein may be modified in any manner that accomplishes the functions described herein. In addition, functions/features disclosed herein may be performed in any order that accomplishes a desired operation.

A computer program may be provided/encoded on a non-transitory computer readable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

Methods and systems disclosed herein may employ any number of any type of user interface (e.g., Graphical User Interface (GUI), command-line, prompt, etc.) to obtain or provide information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

Methods and systems are disclosed below to transform a dataset to one that has desired privacy properties and at least some desired detectable patterns and undetectable patterns.

A pattern may be selected to remain detectable or to be undetectable based on, for example, a measure of interestingness, a financial value of the pattern (e.g., with respect to a researcher), a contractual and/or legislative requirement (e.g., government export control laws), a desire to maintain the pattern as a trade secret, and/or to construct/provide multiple transformed versions of a dataset (e.g., each version may be priced based on the detectable patterns of the respective version).

Transformation of a dataset to achieve privatization, while controlling discoverability of patterns of the dataset, may be formulated as a constraint satisfaction problem (CSP). CSPs are mathematical problems defined as a set of objects whose state must satisfy a number of constraints or limitations. CSPs often exhibit high complexity, requiring a combination of heuristics and combinatorial search methods to be solved in a reasonable time.

Classic CSPs treat constraints as hard, meaning that they are imperative (each solution must satisfy all of them), and inflexible (in the sense that they must be completely satisfied or else they are completely violated).

Flexible CSPs relax those assumptions, partially relaxing the constraints and allowing the solution to not comply with all of them.

Disclosed herein are hybrid CSP techniques in which some constraints are inflexible (e.g., privacy constraints), and other constraints are flexible (e.g., constraints related to patterns that should be detectable or non-detectable in the transformed dataset).

One or more features of environment 100 (FIG. 1) may be configured or implemented as described in one or more examples below. Features of environment 100 are not, however, limited to the examples below.

Figure 2:
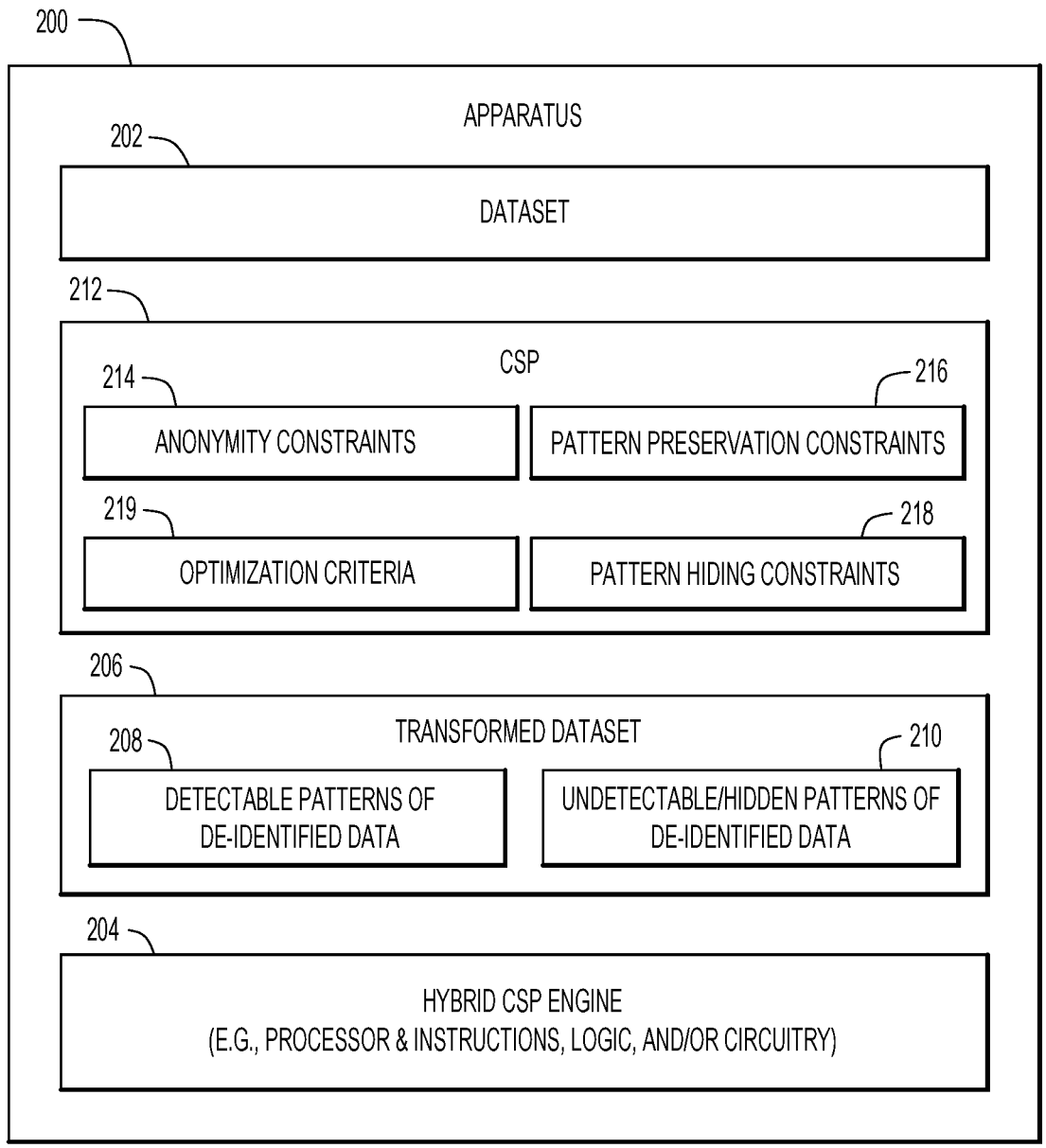
FIG. 2 is a block diagram of an apparatus that includes a hybrid constraint satisfaction problem (CSP) engine to transform a dataset to one in which data is privatized, and in which a first subset of data patterns remains detectable and a second set of data patterns is concealed, hidden, or otherwise becomes undetectable, according to an embodiment of the present invention.

FIG. 2 is a block diagram of an apparatus 200 that includes a hybrid CSP (HCSP) engine 204 to transform a dataset 202 to a transformed dataset 206 in which data is privatized, and in which a first subset of data patterns 208 remains detectable and a second set of data patterns 210 is hidden or otherwise undetectable.

Apparatus 200 may represent an example implementation of server system 110 or client system 114 in FIG. 1, or a combination thereof. Apparatus 200 is not, however, limited to the example of FIG. 1.

HCSP engine 204 is configured to receive as input:
dataset 202 containing sensitive (e.g., personal) information;
an indication of a pattern(s) that should remain discoverable in transformed dataset 206 after privatization; and
an indication of a pattern(s) that should be concealed, hidden, or otherwise undetectable in transformed dataset 206 after privatization.

HCSP engine 204 is further configured to construct a CSP 212 to include:
a set of privacy constraints 214 that define what needs to be protected in transformed dataset 206 in order for transformed dataset 206 to be considered as sufficiently anonymized, where the privacy constraints depend on the particular privacy model/algorithm to be applied/enforced to the dataset;
a set of pattern preservation constraints 216 that define patterns that are to remain discoverable in transformed dataset 206;
a set of pattern hiding constraints 218 that define patterns to be concealed/hidden/undetectable in transformed dataset 206; and
optimization criteria 219.

HCSP engine 204 is further configured to determine a solution of CSP 212 in which:
privacy constraints 214 are defined as hard constraints that must be supported in transformed dataset 206; and
pattern preservation constraints 216 and pattern hiding constraints 218 are defined as soft constraints, such that some of pattern preservation constraints 216 and pattern hiding constraints 218 may be relaxed or unsupported in transformed dataset 206 if they conflict with the privacy constraints 214.

Optimization criterion 219 may be configured to minimize a distance (i.e., a difference) between dataset 202 and transformed dataset 206 (e.g., by minimally distorting dataset 202 to produce transformed dataset 206).

Alternatively, or additionally, optimization criterion 219 may be based on pattern pricing information (i.e., maximize price subject to constraints), or at least the eviction/relaxation strategy that is enforced when all constraints in the CSP cannot be satisfied, should be based on pricing information.

Based on CSP formulation, the impact of removal of each constraint(s) on the dataset is pre-determinable (e.g., it is known from the outset that if constraint X is removed, then, for example, pattern P will remain discoverable, and if constraint Y is removed, then, for example, pattern P' will become undiscoverable).

Apparatus 200 may be configured as described in one or more examples below. Apparatus 200 is not, however, limited to the examples below.

Figure 3:
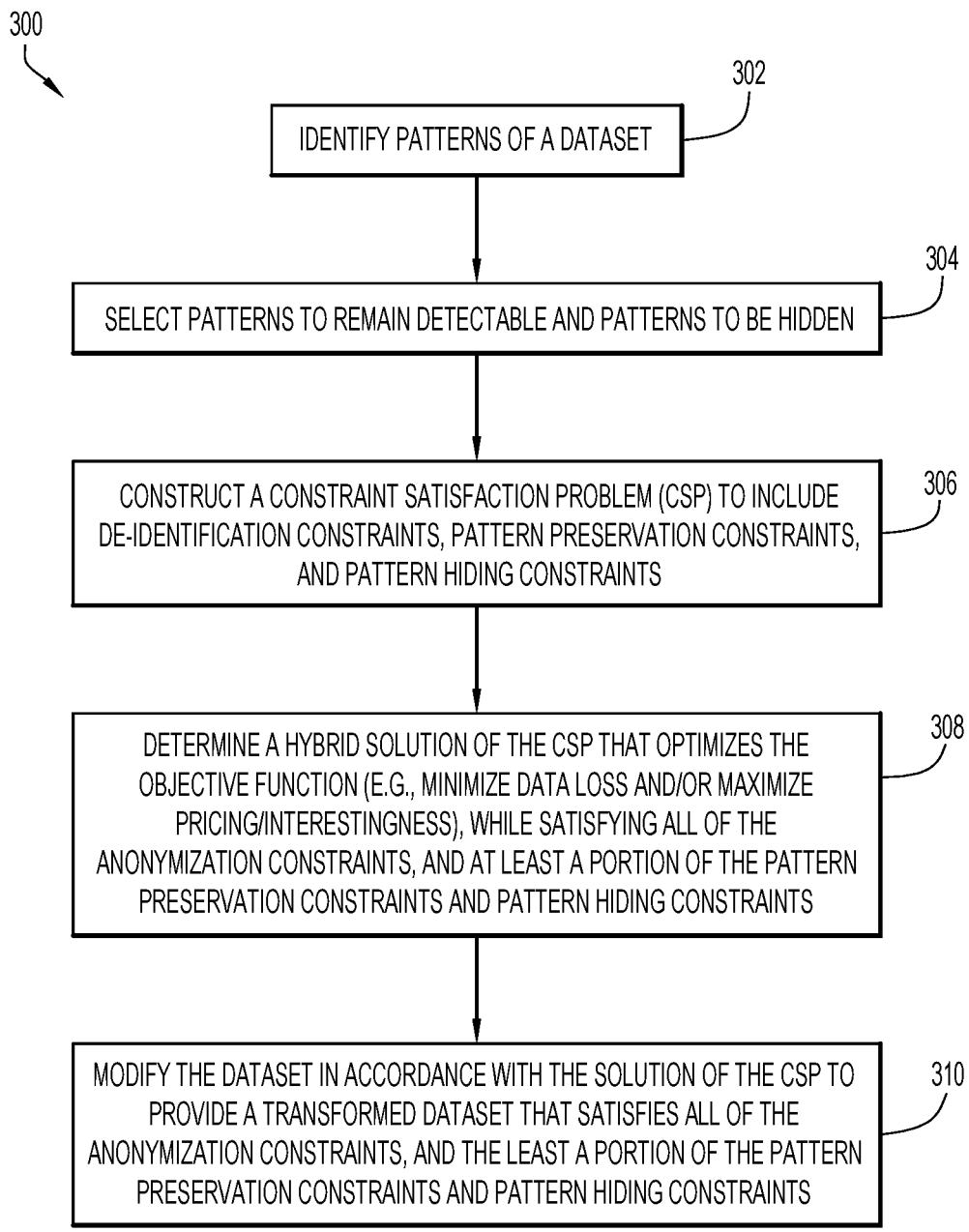
FIG. 3 is a process flowchart of a method of transforming an original dataset to a dataset in which data is privatized, and in which a first set of patterns of the dataset remain detectable, and in which a second set of patterns of the dataset is undetectable, according to an embodiment of the present invention.

FIG. 3 is a process flowchart of a method 300 of transforming a dataset to a dataset in which data is privatized, and in which a first set of patterns of the dataset remain detectable, and in which a second set of patterns of the dataset is undetectable.

Method 300 may be performed by server system 110 and/or client system(s) 114 in FIG. 1, and/or by HSCP engine 204 in FIG. 2. Method 300 is not, however, limited to the examples of FIG. 1 or FIG. 2.

At 302, patterns of a dataset are identified. The patterns may be detected with one or more pattern recognition or data mining techniques, such as by applying frequent itemset mining or association rule mining on the dataset.

At 304, a first subset of the identified patterns is selected to remain detectable in a transformed dataset, and a second subset of the detected patterns is selected to be undetectable in the transformed dataset.

The selections at 304 may be made in various ways and/or on various bases. Selections may, for example, be based on a use-case to be supported by the resultant transformed dataset. Selections may be based on feedback from an analyst/recipient of the transformed dataset. Selections may be based on a cost or price assigned to respective patterns (e.g., how much an analyst/recipient is willing to pay to receive access to the dataset). In all such cases, a price is assigned to each pattern discovered from the original dataset and this price is used to control the solution of the CSP, so that the total price of the resulting dataset is maximized.

At 306, a CSP is constructed to include privacy constraints (e.g., based on community standards, contract, and/or legislative requirements), pattern preservation constraints that are based on the first subset of patterns, and pattern hiding constraints that are based on the second subset of patterns.

At 308, the CSP is solved with a hybrid CSP technique that on one hand aims to minimize information loss in the transformed dataset while satisfying all of the privacy constraints, and at least a portion of the pattern preservation and pattern hiding constraints, and on the other hand aims to maximize the total price/interestingness of the resulting dataset, by selectively evicting any pattern preservation and/or pattern hiding constraints that conflict with privacy constraints of the CSP. The formulated CSP at 308 may include both information loss based optimization criteria and price-based optimization criteria, in order to prefer solutions that meet both such criteria. Alternatively, price-based criteria may be enforced separately (and not as part of the optimization criterion of the CSP) when constraint relaxation is required.

Privacy constraints can always (by construction) be satisfied. Hence, privacy of the transformed dataset is guaranteed. Whereas pattern preservation constraints and/or pattern hiding constraints may conflict with privacy constraints. In such cases, CSP constraint relaxation techniques are applied to remove a minimal number of conflicting pattern preservation constraints and/or pattern hiding constraints, so that the remaining constraints lead to a solvable CSP. The process that is enforced for the removal constraints from the CSP can be based on pricing criteria so that the set of constraints that minimally affect the total price of the dataset are selected for eviction.

At 310, the dataset is modified in accordance with the solution of the CSP to provide a transformed dataset that satisfies all of the privacy constraints and at least a portion of the pattern preservation and pattern hiding constraints.

Figure 4:
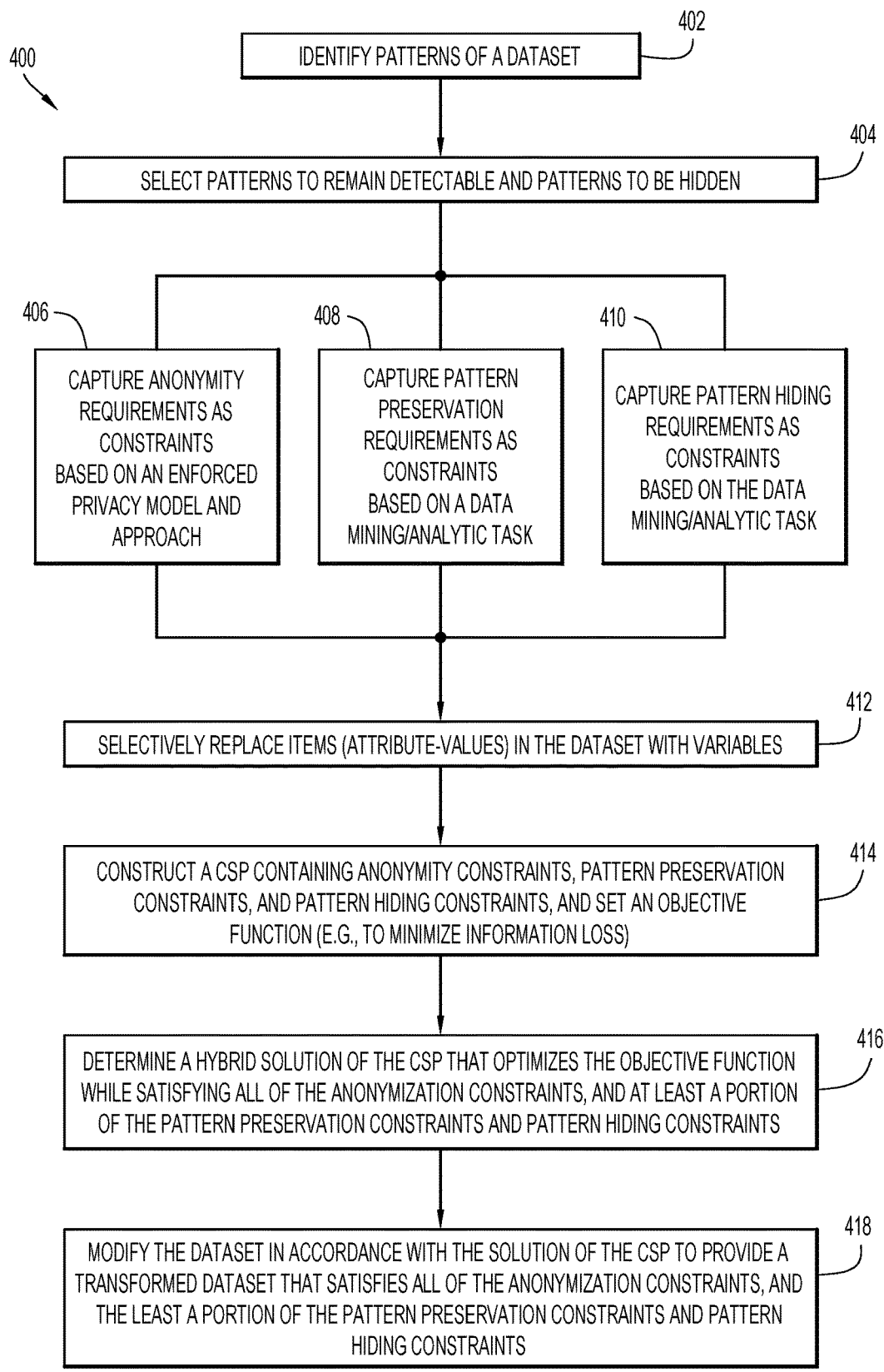
FIG. 4 is a process flowchart of a method constructing a CSP, according to an embodiment of the present invention.

FIG. 4 is a process flowchart of a method 400 to illustrate an example of constructing a CSP (i.e., 306 of method 300).

At 402, patterns of a dataset are identified, such as described above with respect to 302 in FIG. 3.

At 404, a first subset of the identified patterns is selected to remain detectable in a transformed dataset, and a second subset of the detected patterns is selected to be undetectable in the transformed dataset, such as described above with respect to 304 in FIG. 3.

At 406, privacy requirements are defined as privacy constraints. This may be based on an enforced privacy model/approach, which may be dictated by community practice, contractual requirements, and/or legislative dictates.

At 408, pattern preservation requirements are defined as pattern preservation constraints (e.g., based on a data mining/analytic task).

At 410, pattern hiding requirements are defined as pattern hiding constraints (e.g., based on the data mining/analytic task).

Processing at 406, 408, and 410 may be performed in any order or simultaneously (e.g., in parallel and/or in a distributed fashion).

At 412, items (i.e., attribute-values) of the dataset are selectively replaced with variables.

At 414, a CSP is constructed to include the privacy constraints of 406, the pattern preservation constraints of 408, and the pattern hiding constraints of 410. An objective function of the CSP may be configured, such as to minimize information loss in the transformed dataset. Pattern pricing information may be also considered as part of the enforced optimization criterion of the CSP.

At 416, the CSP is solved, such as described above with respect to 308 in FIG. 3.

At 418, the dataset is modified in accordance with the solution of the CSP, such as described above with respect to 310 in FIG. 3.

Figure 5:
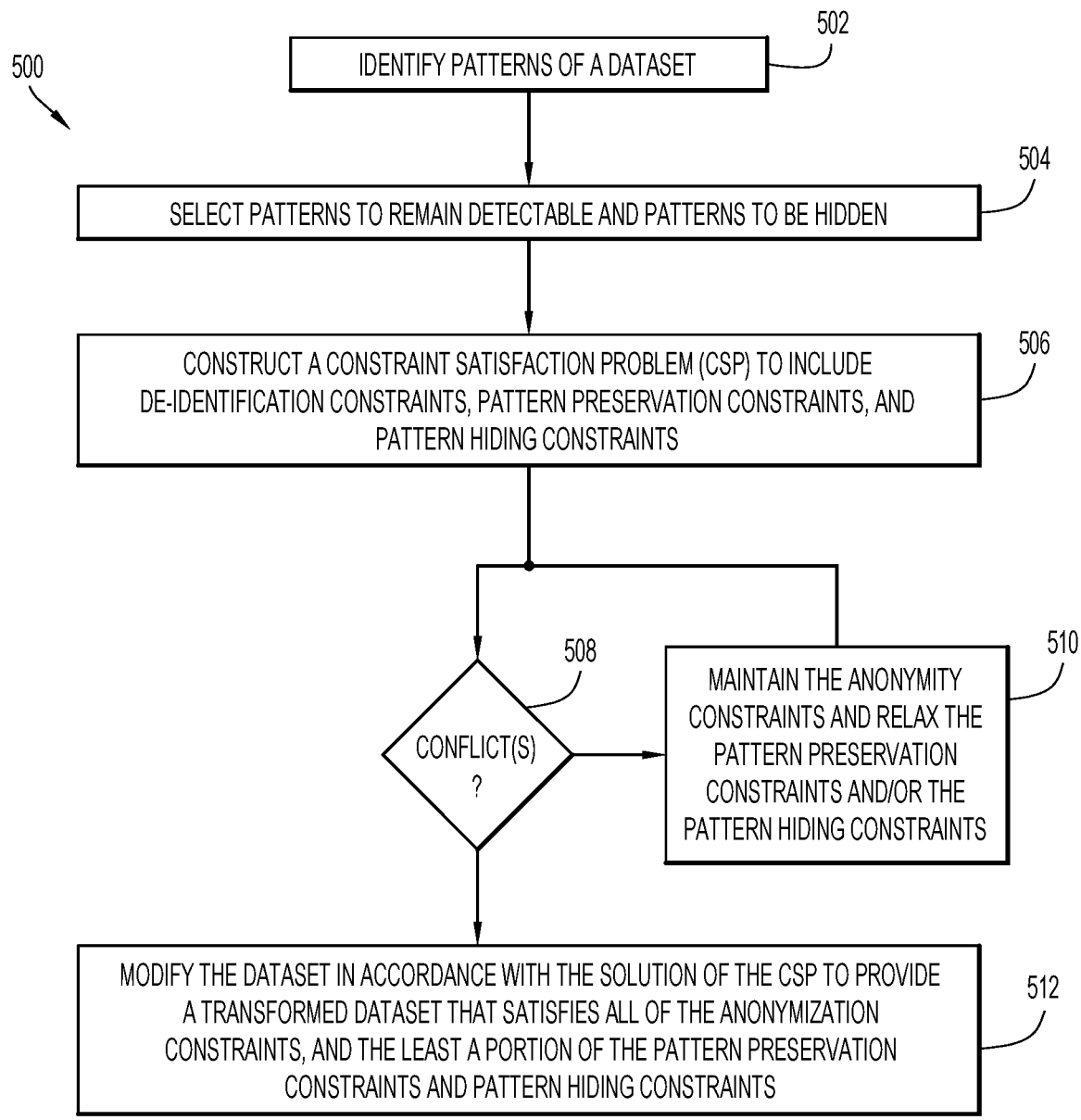
FIG. 5 is a process flowchart of a method of determining a hybrid solution of a CSP, according to an embodiment of the present invention.

FIG. 5 is a process flowchart of a method 500 of an example of determining a hybrid solution of a CSP (i.e., 308 of method 300).

At 502, patterns of a dataset are identified, such as described above with respect to 302 in FIG. 3.

At 504, a first subset of the identified patterns is selected to remain detectable in a transformed dataset and a second subset of the detected patterns is selected to be undetectable in the transformed dataset, such as described above with respect to 304 in FIG. 3.

At 506, a CSP is constructed, such as described above with respect to 306 in FIG. 3.

At 508, the CSP is evaluated for conflicts amongst the constraints (e.g., conflicts between the privacy constraints and the pattern preservation constraints and/or the pattern hiding constraints). If a conflict is detected, processing proceeds to 510.

At 510, the privacy constraints are maintained, and one or more of the pattern preservation constraints and/or pattern hiding constraints is relaxed or removed from the CSP. The relaxation process may take into account the pricing information that has been associated with the pattern(s) that are modeled by the corresponding constraint(s), from which the selection for eviction should be performed. Preference may be given to eviction of constraints that have minimal impact on the pricing of the overall dataset.

Processing iterates between 508 and 510 until no conflicts are detected at 508. When no conflicts are detected at 508, processing proceeds to 512.

At 512, the dataset is modified in accordance with the solution of the CSP, such as described above with respect to 310 in FIG. 3.

Techniques disclosed herein may be applied to datasets of various industries, including, without limitation, healthcare, telecommunications, banking, and retail. An example is provided below with respect to a healthcare industry database (i.e., a database of patient medical diagnoses codes).

Examples are provided below with respect to a dataset that includes patient diagnoses codes associated with identifiers (IDs) of the respective patients.

It is well-known that background knowledge of only a few diagnosis codes by an adversary can lead to patient re-identification attacks. This is due to the uniqueness/distinguishability of these codes and the fact that they are part of hospital discharge summaries. At the same time, association rule mining is a popular medical data mining task which can be used to uncover interesting relationships that hold among items, such as among diagnosis codes of patients, or among diagnosis codes and demographics information of patients, or diagnosis codes and DNA information associated with patients.

As described further above, privatization and pattern hiding may be performed sequentially. However, if patterns are hidden after privatization, the dataset may no longer adhere to privatization requirements (i.e., due to transformations performed by a pattern hiding algorithm). If the patterns are concealed before privatization, privatization may inadvertently re-instate a concealed pattern and/or may inadvertently conceal another (desired) pattern(s) of the database. Also, in either of the above scenarios, data may be unnecessarily omitted from the database. Examples of the above scenarios are provided below with reference to FIGS. 6 and 7, respectively.

Figure 6:
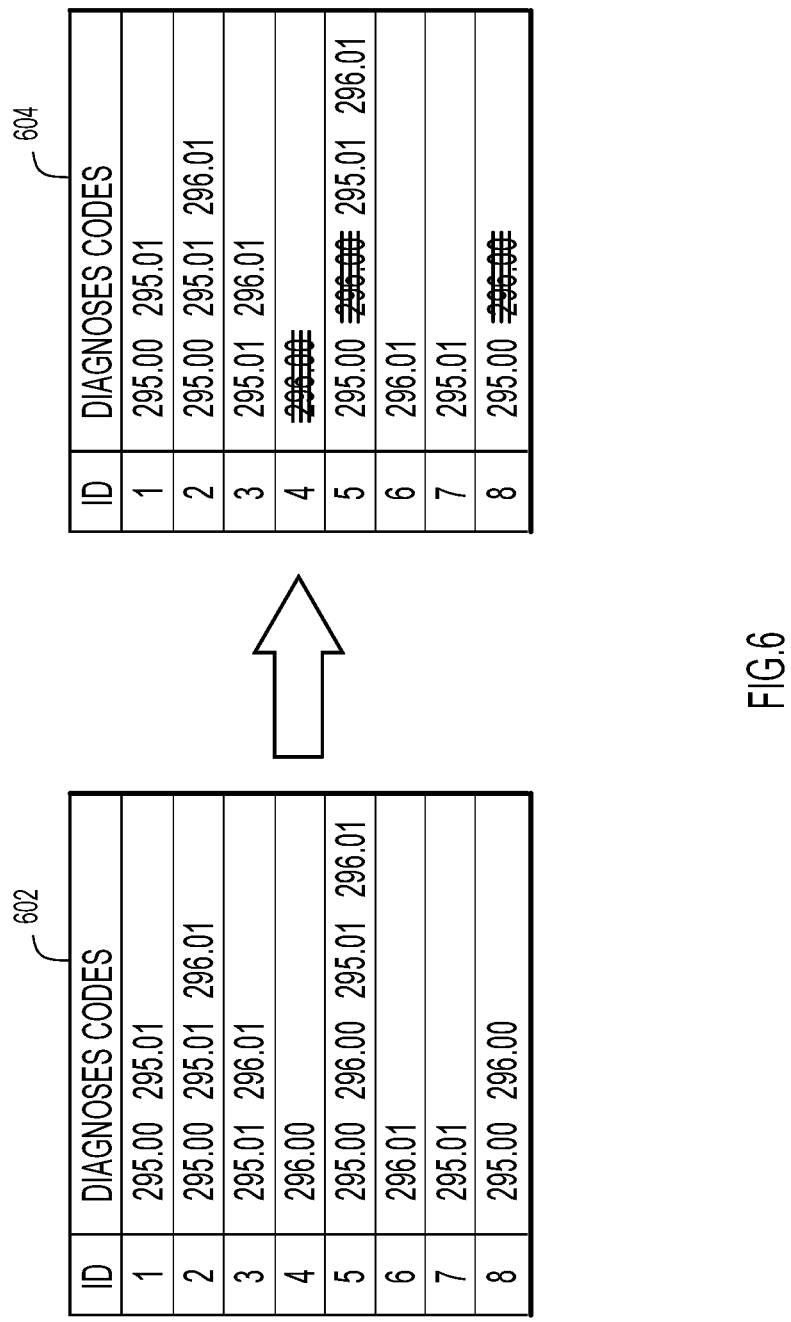
FIG. 6 illustrates a dataset and a corresponding transformed dataset in which data is anonymized (2-complete anonymous), and in which a pattern deemed sensitive is subsequently concealed, according to an embodiment of the present invention.

FIG. 6 illustrates a dataset 602, and a corresponding transformed dataset 604 in which data is anonymized (2-complete anonymous), and in which a pattern deemed sensitive is subsequently concealed. Specifically, sensitive frequent pattern {295.00, 296.00} is concealed, as its support is below the support threshold of 0.2 (in this example it is 0). The distance of this solution is 3 (i.e., there are 3 item deletions).

As another example, sensitive patterns are hidden followed by privatization. A potential drawback of this approach is that privatization may re-instate previously hidden patterns. Moreover, it may not be possible to guarantee that non-sensitive/acceptable patterns will remain discoverable in the transformed dataset, as the non-sensitive/acceptable patterns may be affected by the privatization process. An example is illustrated in FIG. 7.

Figure 7:
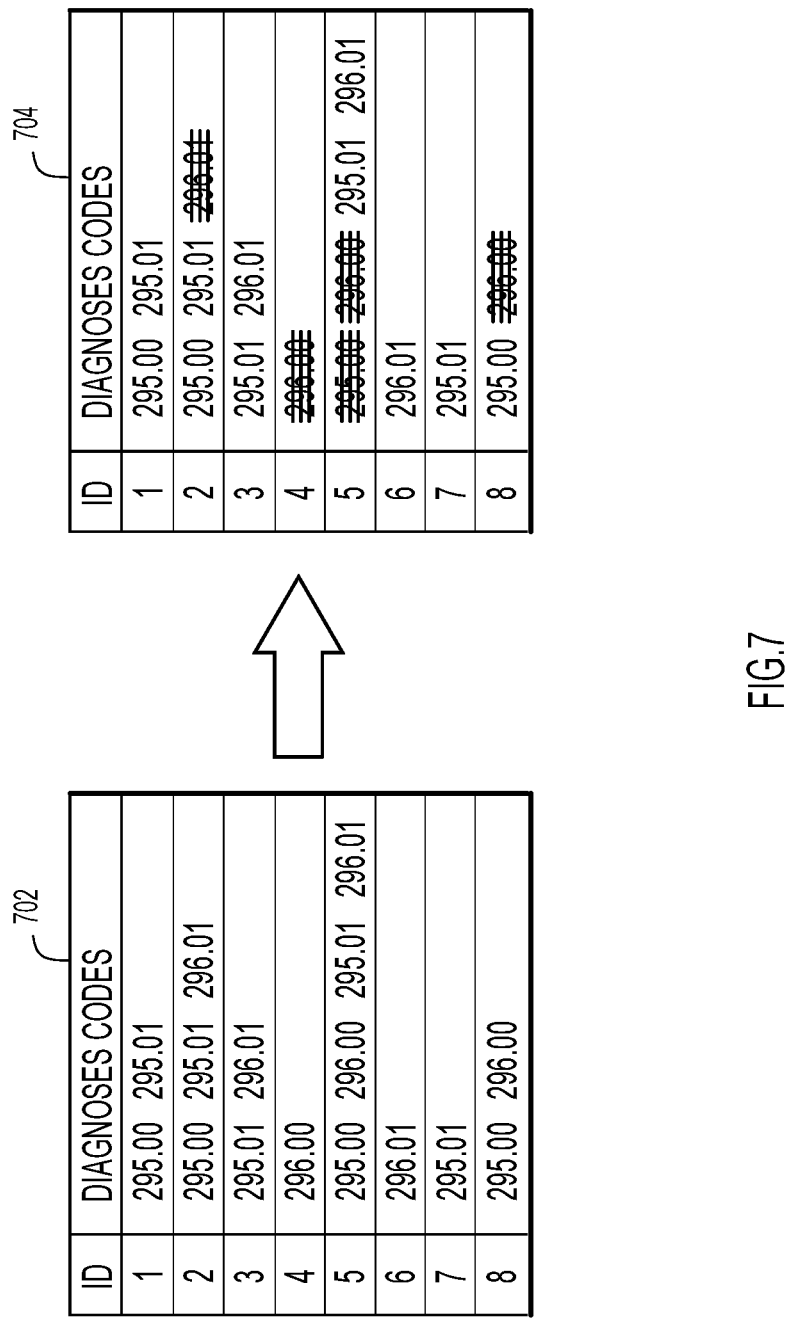
FIG. 7 illustrates another dataset and a corresponding transformed dataset in which a pattern deemed sensitive is concealed, and in which data is subsequently anonymized (2-complete anonymous), according to an embodiment of the present invention.

FIG. 7 illustrates a dataset 702, and a corresponding transformed dataset 704 in which a pattern deemed sensitive is concealed, and in which data is subsequently anonymized (2-complete anonymous). Specifically, sensitive frequent pattern {295.00, 296.00} is concealed, as its support is below the support threshold of 0.2 (in this example it is 0).

In transformed dataset 704, item 295.00 is removed from ID 5 to conceal sensitive frequent pattern {295.00, 296.00}. Thereafter, four additional items are removed to anonymize transformed dataset 704. As a result, frequent pattern {295.00, 295.01, 295.01} is not preserved in transformed dataset 704, which may reduce a value of transformed dataset 704. The distance of this solution is 5 (i.e., there are 5 item deletions).

As disclosed herein, an improved approach is to privatize, hide sensitive patterns, and preserve interesting non-sensitive patterns in conjunction with one another, an example of which is provided below with reference to FIG. 8.

Figure 8:
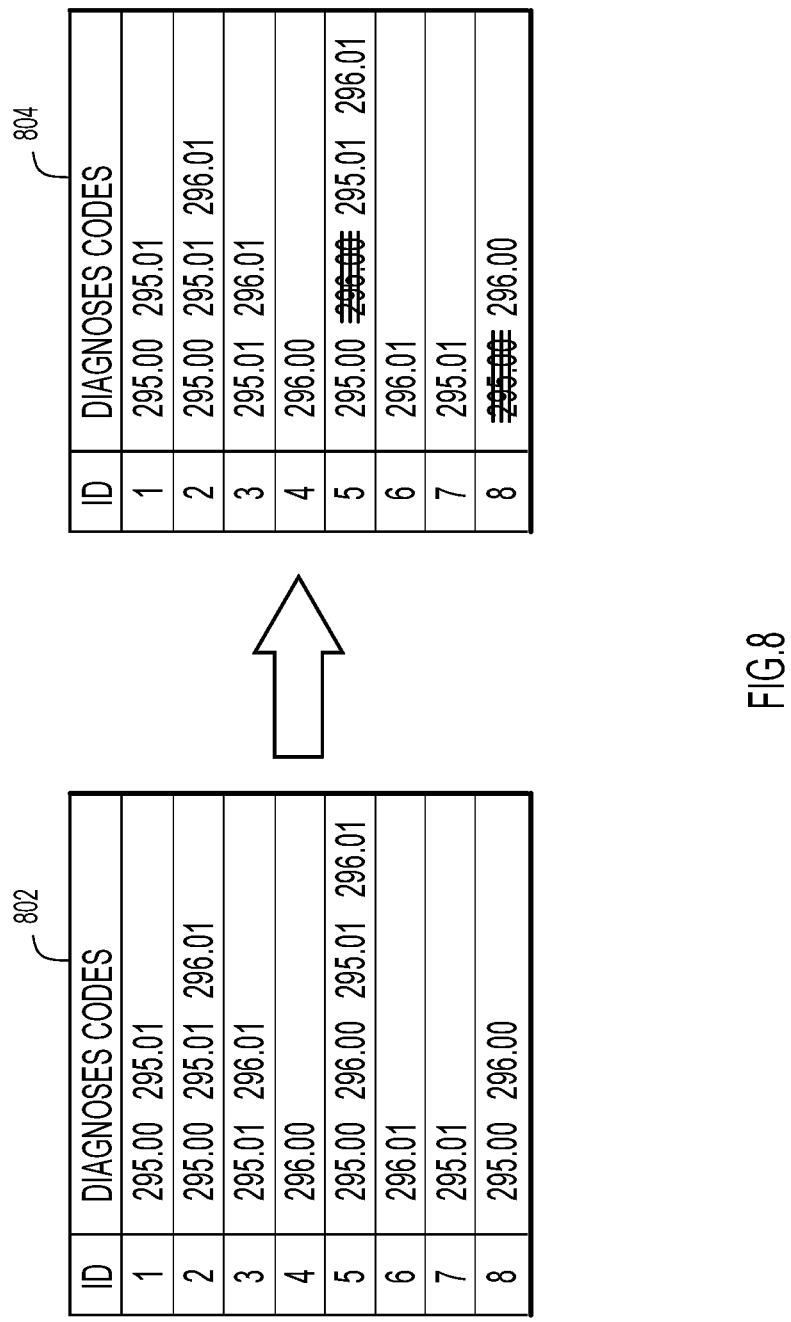
FIG. 8 illustrates another dataset and a corresponding transformed dataset in which data is anonymized (2-complete anonymous), and in which a sensitive pattern is concealed, in conjunction with one another, according to an embodiment of the present invention.

FIG. 8 illustrates a dataset 802, and a corresponding transformed dataset 804 in which data is anonymized (2-complete anonymous), and in which a sensitive pattern is concealed, in conjunction with one another. Specifically, sensitive frequent pattern {295.00 296.00} is concealed, as its support is below the support threshold of 0.2 (in this example it is 0). Also, frequent pattern {295.00, 295.01, 295.01} is preserved.

Assuming that pattern {295.00, 295.01, 296.01} has been deemed interesting by the data owner and has been assigned a price of $400, the preservation of this pattern in the dataset (as its support is above the support threshold of 0.2) increases the value of transformed dataset 804 by $400. The distance of this solution is 2 (i.e., there are 2 item deletions), which is less than in the examples of FIGS. 6 and 7.

Further to the example of FIG. 8, an example is provided below in which a binary CSP is constructed from privacy constraints, pattern preservation constraints, and pattern hiding constraints. A solution of the CSP, using integer programming methods, yields an assignment to the binary variables that is used to generate a final dataset (i.e., transformed dataset). The example technique uses dataset 802, which is reproduced in Table 1 below.

TABLE 1

Original Dataset

| ID | Diagnoses codes |
|----|-----------------|
| 1  | 295.00, 295.01 |
| 2  | 295.00, 295.01, 296.01 |
| 3  | 295.01, 296.01 |
| 4  | 296.00 |
| 5  | 295.00, 296.00, 295.01, 296.01 |
| 6  | 296.01 |
| 7  | 295.01 |
| 8  | 295.00, 296.00 |

In an embodiment, one privacy constraint (AC) is specified per data record ID (i.e., for each subject's record in the table). Examples are provided below:

ID=1: support({295.00 295.01})≥2 OR support({295.00 295.01})=0

ID=2: support({295.00 295.01 296.01})≥2 OR support({295.00 295.01 296.01})

ID=3: support({295.01 296.01})≥2 OR support({295.01 296.01})=0

ID=4: support({296.00})≥2 OR support({296.00})=0

ID=5: support({295.00 296.00 295.01 296.01})≥2 OR support({295.00 296.00 295.01 296.01})=0

ID=6: support({296.01})≥2 OR support({296.01})=0

ID=7: support({295.01})≥2 OR support({295.01})=0

ID=8: support({295.00 296.00})≥2 OR support({295.00 296.00})=0

While privacy constraints are typically one per record ID, one pattern preservation constraint may be defined per pattern to be retained in the data. For this example, frequent itemset/pattern {295.00, 295.01} in Table 1 is to be retained (i.e., is to remain discoverable). Specifically, the pattern is to be maintained at a minimum frequency threshold of 0.2. This means, that the pattern should have a support threshold at least equal to 0.2×8 records (in the data)⇒1.6. Hence, the following constraint pattern preservation constraint:

support({295.00 295.01})≥0.2×8⇒support({295.00 295.01})≥1.6, or equivalently, support({295.00 295.01})≥0.2×8⇒support({295.00 295.01})≤2.

Similarly, one pattern hiding constraint may defined per pattern to be concealed. For this example, frequent itemset/pattern {295.00, 296.00} is sensitive (i.e., to be concealed), with a minimum frequency threshold of 0.2. Hence, the following pattern hiding constraint:

support({295.00 296.00})<0.2×8⇒support({295.00 296.00})<1.6, or equivalently:

support({295.00 296.00})<0.2×8⇒support({295.00 296.00})≤1

In Table 1, each record/individual is associated with one or more items (e.g., diagnoses codes, products purchased, etc.). In an embodiment, a goal is to protect patient privacy while retaining desired/important patterns, and hiding/suppressing sensitive patterns. Thus, in the resulting (i.e., transformed) dataset, each record/individual will be associated with the same or fewer items than in the original dataset. Thus, by construction, in the resulting dataset, no new items will be associated with any record. An item that is associated with an individual in Table 1 may remain associated with the individual in the transformed dataset, or may be deleted/suppressed from the record so that it is no longer associated with the individual.

Such a binary nature of items may be captured using an intermediate view of Table 1, where each original item is replaced with a unique binary variable $u_{ij}$. Such an internal representation is shown in Table 2.

TABLE 2

Intermediate Data Representation

| ID | 295.00 | 296.00 | 295.01 | 296.01 |
|---|---|---|---|---|
| 1 | $u_{11}$ | 0 | $u_{13}$ | 0 |
| 2 | $u_{21}$ | 0 | $u_{23}$ | $u_{24}$ |
| 3 | 0 | 0 | $u_{33}$ | $u_{34}$ |
| 4 | 0 | $u_{32}$ | 0 | 0 |
| 5 | $u_{51}$ | $u_{52}$ | $u_{53}$ | $u_{54}$ |
| 6 | 0 | 0 | 0 | $u_{64}$ |
| 7 | 0 | 0 | $u_{73}$ | 0 |
| 8 | $u_{81}$ | $u_{82}$ | 0 | 0 |

For illustrative purposes, binary variables of Table 2 are based on row number and item column number.

Each variable $u_{ij}$ may have value "1" or value "0", where value "1" means that the corresponding item is retained in the resulting dataset, while value "0" means that the corresponding item is suppressed. Thus, if the binary variables $u_{ij}$ of Table 2 are replaced with "1", Table 2 will match the original data of Table 1.

The privacy constraints, pattern preservation constraints, and pattern hiding constraints may be rewritten using the binary variables introduced in Table 2. This is shown below.

ID=1: $u_{11}u_{13}+u_{21}u_{23}+u_{51}u_{53} \geq 2$ OR $u_{11}u_{13}+u_{21}u_{23}+u_{51}u_{53}=0$ ID=2: $u_{21}u_{23}u_{24}+u_{51}u_{53}u_{54} \geq 2$ OR $u_{21}u_{23}u_{24}+u_{51}u_{53}u_{54}=0$ ID=3: $u_{23}u_{24}+u_{33}u_{34}+u_{53}u_{54} \geq 2$ OR $u_{23}u_{24}+u_{33}u_{34}+u_{53}u_{54}=0$ ID=4: $u_{42}+u_{52}+u_{82} \geq 2$ OR $u_{42}+u_{52}+u_{82}=0$ ID=5: $u_{51}u_{52}u_{53}u_{54} \geq 2$ OR $u_{51}u_{52}u_{53}u_{54}=0$ ID=6: $u_{24}+u_{34}+u_{54}+u_{64} \geq 2$ OR $u_{24}+u_{34}+u_{54}+u_{64}=0$ ID=7: $u_{13}+u_{23}+u_{33}+u_{53}+u_{73} \geq 2$ OR $u_{13}+u_{23}+u_{33}+u_{53}+u_{73}=0$ ID=8: $u_{51}u_{52}+u_{81}u_{82} \geq 2$ OR $u_{51}u_{52}+u_{81}u_{82}=0$ PKEEP: $u_{11}u_{13}+u_{21}u_{23}+u_{51}u_{53} \geq 2$ PHIDE: $u_{51}u_{52}+u_{81}u_{82} \leq 1$ Support of an itemset may be calculated using binary variables. For each itemset, a sum is produced over the transactions supporting the corresponding itemset. This corresponds to the overall support of the itemset. For a record to support an itemset, it must contain all the items of the itemset (order is not important). Hence the product of the corresponding binary variables may be used for the items in the itemset to capture this. A product of "1" for the corresponding variables means that all items of the itemset are present in the record. Hence the record supports the itemset. The sum over all records potentially supporting the itemset (i.e., having no-known "0" value for at least one item of the itemset), provides the overall support of the itemset in the dataset. The term "support(•)" is then replaced with the corresponding mathematical formula.

The binary variables of the privacy constraints, pattern preservation constraints, and pattern hiding constraints may be incorporated into a binary CSP that can be solved with binary integer programming. The CSP may be expressed as:

maximize($u_{11}+u_{13}+u_{21}+u_{23}+u_{24}+u_{33}+u_{34}+u_{42}+u_{51}+u_{52}+u_{53}+u_{54}+u_{64}+u_{73}+u_{81}+u_{82}$);

subject to the following AC constraints, $u_{11}u_{13}+u_{21}u_{23}+u_{51}u_{53} \geq 2$ OR $u_{11}u_{13}+u_{21}u_{23}+u_{51}u_{53}=0$ $u_{21}u_{23}u_{24}+u_{51}u_{53}u_{54} \geq 2$ OR $u_{21}u_{23}u_{24}+u_{51}u_{53}u_{54}=$ $u_{23}u_{24}+u_{33}u_{34}+u_{53}u_{54} \geq 2$ OR $u_{23}u_{24}+u_{33}u_{34}+u_{53}u_{54}=0$ $u_{42}+u_{52}+u_{82} \geq 2$ OR $u_{42}+u_{52}+u_{82}=0$ $u_{51}u_{52}u_{53}u_{54} \geq 2$ OR $u_{51}u_{52}u_{53}u_{54}=0$ $u_{24}+u_{34}+u_{54}+u_{64} \geq 2$ OR $u_{24}+u_{34}+u_{54}+u_{64}=0$ $u_{13}+u_{23}+u_{33}+u_{53}+u_{73} \geq 2$ OR $u_{13}+u_{23}+u_{33}+u_{53}+u_{73}=0$ $u_{51}u_{52}+u_{81}u_{82} \geq 2$ OR $u_{51}u_{52}+u_{81}u_{82}=0$ and further subject to preservation constraints $u_{11}u_{13}+u_{21}u_{23}+u_{51}u_{53} \geq 2$
and further subject to hiding constraints $u_{51}u_{52}+u_{81}u_{82} \leq 1$
where: $u_{ij} \in \{0, 1\}$, $\forall i,j$ The solution of the above CSP corresponds to an assignment of binary value "0" or "1" to each of the binary variables $u_{ij}$. This includes replacing the variables in the intermediate form of the dataset, shown in Table 2, with the corresponding values attained via the solution of the CSP. Table 3 shows an example solution.

TABLE 3

| | CSP Solution | | | |
|---|---|---|---|---|
| ID | 295.00 | 296.00 | 295.01 | 296.01 |
| 1 | 1 | 0 | 1 | 0 |
| 2 | 1 | 0 | 1 | 1 |
| 3 | 0 | 0 | 1 | 1 |
| 4 | 0 | 1 | 0 | 0 |
| 5 | 1 | 0 | 1 | 1 |
| 6 | 0 | 0 | 0 | 1 |
| 7 | 0 | 0 | 1 | 0 |
| 8 | 0 | 1 | 0 | 0 |

The binary CSP may be solved with (binary) integer programming techniques.

With the foregoing approach, privatization of the transformed dataset is assured, and discoverable patterns of the transformed dataset are readily determinable from the CSP solution (i.e., from the remaining pattern constraints of the CSP solution, or from the omitted pattern constraints of the CSP solution).

In the foregoing example, the set of constraints generated for the privacy requirements involves a special case in which there is a disjunction with an inequality and an equation. Constraint satisfaction problems which involve generalized linear constraints that include disjunctions with equations and inequalities have been studied.

In an embodiment, all items involved in privacy and pattern preservation/hiding constraints are replaced with binary variables. In another embodiment, fewer/selected original items are replaced with binary variables to produce a smaller CSP and speed up the computation of the solution.

Techniques disclosed herein may be used to preserve and hide a variety of types of patterns. Examples presented herein use frequent itemsets. Other types of patterns, such as association rules, may be captured and represented with constraints in the CSP.

Depending on the type of constraints used for a CSP, different approaches for solving the CSP may be used. Moreover, different strategies for relaxing unsolvable CSPs in order to attain a solution may be selected.

A machine learning technique(s) may be employed, such as to detect patterns in a dataset, characterize the patterns with respect to interestingness, prioritize the patterns based on the characterizations, assign a monetary value to the patterns, develop anonymity constraints, pattern hiding constraints, and/or pattern preservation constraints, and/or to solve the CSP, such as to relax or modify the pattern constraints. Various models may be employed to perform the learning, such as, without limitation, neural networks, mathematical/statistical models, and/or classifiers.

Given the complexity of solving very large CSPs that contain many constraints and variables, heuristic techniques, as well as techniques that are based on structural CSP decomposition and parallel solving, may be used. In an embodiment, a CSP may be split or decomposed into a number of CSPs, which may be solved in parallel by different processors, or the entire CSP may be solved using a distributed approach.

One or more of a variety of types of privacy models may be utilized including, without limitation, k-anonymity, l-diversity, k$^m$-anonymity, complete k-anonymity, and set-based anonymization. A set of privacy constraints may be generated for each such privacy model, allowing the support of the corresponding model on the data with minimum data distortion/transformation.

As stated further above, privacy constraints will always be solvable. Consider, for example, the equality constraints in the privacy constraints, which lead to setting all binary variables to "0". This means that the CSP will always be able to offer the privacy level that is required in the transformed dataset, irrespective of how many patterns are preserved and how many sensitive patterns are be hidden.

In an embodiment, patterns are selected to remain detectable or hidden (i.e., 304 of method 300), based on values (e.g., prices) of the respective patterns. Similarly, a transformed dataset may be valued/priced based on the detectable patterns of the transformed dataset. Examples are provided below with reference to FIGS. 9 through 14.

Figure 9:
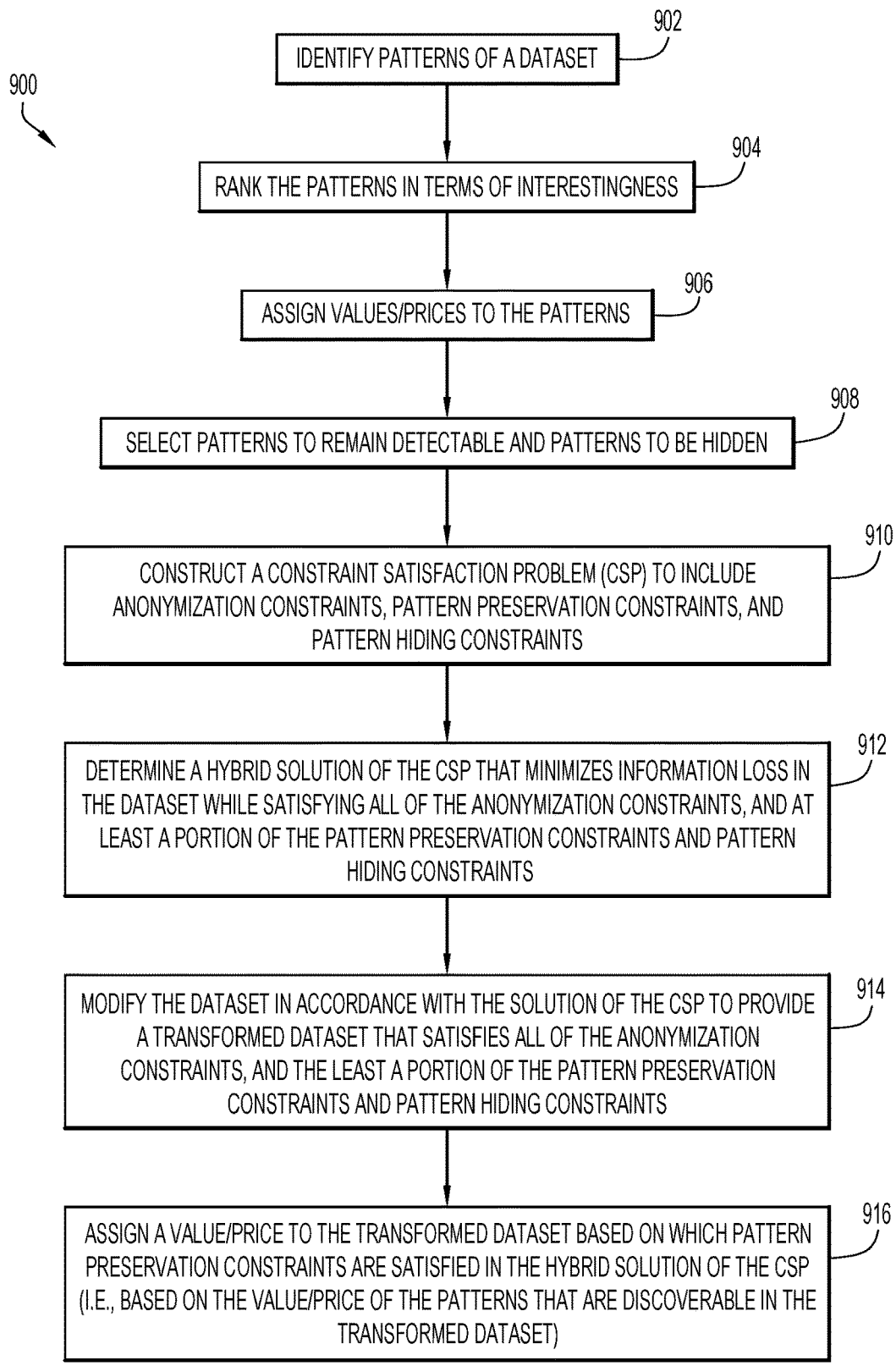
FIG. 9 is a process flowchart of a method of assigning a monetary value to a transformed dataset, according to an embodiment of the present invention.

FIG. 9 is a process flowchart of a method 900 of assigning a value (e.g., a price), to a transformed dataset. Method 900 may be performed by server system 110 and/or client system(s) 114 in FIG. 1, and/or by HSCP engine 204 in FIG. 2. Method 900 is not, however, limited to the examples of FIG. 1 or FIG. 2.

At 902, patterns of dataset 202 are identified, such as at 302 in FIG. 3. At 904 of FIG. 9, the identified patterns are ranked in terms of pattern interestingness (PI). There is a multitude of metrics to capture and quantify PI in various data mining tasks such as, for example, clustering or association rule mining. Techniques to determine PI may capture characteristics such as, without limitation, importance, non-triviality, surprisingness or unexpectedness of a pattern being discovered, conciseness, coverage, reliability, peculiarity, diversity, novelty, utility, and/or actionability.

At 906 of FIG. 9, values (e.g., prices) are assigned to the patterns. A value of a pattern may be based on a measure of PI. A value of a pattern may be based on, for example, unexpectedness of the pattern, a competitive advantage that the pattern is deemed to provide to a potential purchaser (e.g., a business of a data analyst), an inference that the pattern may allow for the support of other patterns in the data, and/or other factor(s).

At 908 of FIG. 9, patterns to remain detectable and patterns to be hidden/undetectable are selected, such as at 304 in FIG. 3.

At 910 of FIG. 9, a CSP is constructed, such as at 306 in FIG. 3.

At 912, the CSP is solved with a hybrid CSP technique, such as at 308 in FIG. 3.

At 914, the dataset is modified in accordance with the solution of the CSP to provide a transformed dataset that satisfies all of the privacy constraints and the at least a portion of the pattern preservation and pattern hiding constraints, such as at 310 in FIG. 3.

At 916, a value (e.g., price), is assigned to the transformed dataset based on pattern preservation constraints that are satisfied by the hybrid solution of the CSP (i.e., based on the value/price of the patterns that are discoverable in the transformed dataset). The value/price may reflect useful knowledge that is retained (i.e., that remains detectable) in the transformed dataset. If the transformed dataset includes any sensitive patterns, the value/price of the transformed dataset may increase accordingly.

An example of method 900 is provided below with reference to FIGS. 10, 11, and 12.

FIG. 10 depicts an example dataset 1000 that includes discoverable data patterns 1002, 1004, 1006, 1008, and 1010 (e.g., 902 of method 900).

FIG. 11 depicts a table 1100. Column 1102 of table 1100 lists pattern identifiers (IDs) 1002 through 1010 of FIG. 10. Column 1104 of table 1100 lists corresponding rankings (e.g., 904 of method 900).

Column 1106 of table 1100 provides example dollar values of the patterns of FIG. 10 (e.g., 906 of method 900). A total value of the patterns of FIG. 10 is illustrated as $925. The example dollar values of table 1100 are arbitrarily chosen for illustrative purposes.

Column 1108 of table 1100 specifies "preserve" or "conceal" for each pattern of FIG. 10 (e.g., 908 of method 900). Column 1110 lists the values of the patterns to be preserved, and a total value of the patterns to be preserved (i.e., $375).

FIG. 12 depicts an example transformed dataset 1200 (e.g., 914 of method 900), in which patterns 1002 and 1006 remain discoverable, and patterns 1004, 1008, and 1010 are concealed. In this example, data patterns 1002 and 1006 are preserved and data patterns 1008 and 1010 are concealed, as intended. Whereas data pattern 1004 is inadvertently concealed, which may be due to a conflict with privacy constraints and/or other constraint(s). This is reflected in column 1112 of table 11 (FIG. 11), which indicates that patterns 1002 and 1006 remain discoverable and patterns 1004, 1008, and 1010 are concealed.

Column 1114 of table 11 lists the dollar values of the patterns that remain discoverable in transformed dataset 1200, and the corresponding total dollar value of transformed dataset 1200 as $275 (e.g., 916 of method 900).

In the foregoing example, where pattern 1004 is inadvertently concealed, the dollar value of transformed dataset 1200 (i.e., $275), is less than the anticipated dollar value of $375.

Another example of method 900 is provided below with reference to FIGS. 10, 13, and 14.

As described further above, FIG. 10 depicts an example dataset 1000 that includes discoverable data patterns 1002, 1004, 1006, 1008, and 1010 (e.g., 902 of method 900).

Figures 13, 14:
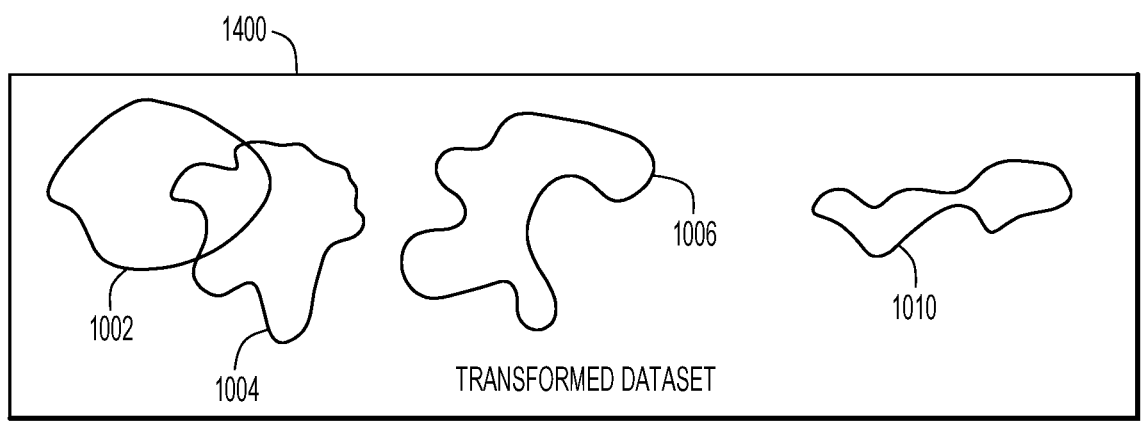
FIG. 13 depicts another table in which the discoverable patterns of FIG. 10 are ranked and valued.
FIG. 14 depicts another example transformed dataset in which another subset of patterns of FIG. 10 are discoverable according to the table of FIG. 13.

FIG. 13 depicts a table 1300. Column 1302 of table 1300 lists pattern identifiers (IDs) 1002 through 1010 of FIG. 10. Column 1304 of table 1300 lists corresponding rankings (e.g., 904 of method 900).

Column 1306 of table 1300 provides example dollar values of the patterns of FIG. 10 (e.g., 906 of method 900). A total value of the patterns of FIG. 10 is illustrated as $925. The example dollar values of table 1300 are arbitrarily chosen for illustrative purposes.

Column 1308 of table 1300 specifies "preserve" or "conceal" for each pattern of FIG. 10 (e.g., 908 of method 900). Column 1310 lists the values of the patterns to be preserved, and a total value of the patterns to be preserved (i.e., $375).

FIG. 14 depicts an example transformed dataset 1400 (e.g., 914 of method 900), in which patterns 1002, 1004, and 1006 remain discoverable and pattern 1008 is concealed, as intended. In this example, data patterns 1002, 1004, and 1006 are preserved, as intended. Whereas data pattern 1010 is inadvertently exposed or preserved, which may be due to a conflict with privacy constraints and/or other constraint(s).

Column 1314 of table 13 lists the dollar values of the patterns that remain discoverable in transformed dataset 1400, and the corresponding total dollar value of transformed dataset 1400 as $625 (e.g., 916 of method 900).

In the foregoing example, where pattern 1008 is inadvertently exposed, the dollar value of transformed dataset 1400 (i.e., $275), is higher than the anticipated dollar value of $375.

A decision as to whether to provide transformed dataset 1200 or transformed dataset 1400 to a customer may depend on whether the customer is willing to pay less than anticipated for a dataset that includes fewer data patterns than anticipated, or is willing to pay more than anticipated for a dataset that includes more data patterns than anticipated. The decision may be mooted if, for some reason(s), it is impermissible (e.g., based on contract or law), to provide data pattern 1010 to the customer.

In summary, where multiple solutions are possible, all having the same distance (objective criterion), the one that maximizes a value (e.g., a price) of the transformed dataset may be selected. If a solution cannot be attained for the CSP due to conflicting constraints, a constraint relaxation process may be employed, in which the least number of pattern preservation and/or pattern hiding constraints is removed from the CSP in order to attain a solvable CSP.

In an embodiment, an optimization criterion is configured to minimize data distortion, which may be measured or captured as a distance or difference between the original dataset and its sanitized/privatized/transformed dataset. Alternatively, or additionally, other optimization criteria may be used to capture information loss and ensure that the produced solution is useful. Value (e.g., pricing) information may, for example, be used in the optimization criterion to optimize the value assignment in the CSP towards maintaining the most profitable/high value patterns.

Due to the "1-1" relationship between constraints and patterns, if a pattern preservation constraint is removed, the corresponding pattern may not remain discoverable in the transformed dataset. Hence a value of the pattern may be subtracted from an overall value of the transformed dataset.

If a pattern hiding constraint is removed, the corresponding sensitive pattern may remain discoverable in the transformed dataset. In some situations, a cost/penalty of leaving a sensitive pattern discoverable is higher than that of not preserving a desired pattern. Hence, pattern preservation constraints may be preferred candidates for relaxation.

Features disclosed herein may be implemented in, without limitation, circuitry, a machine, a computer system, a processor and memory, a computer program encoded in a computer-readable medium, and/or combinations thereof. Circuitry may include, without limitation, discrete and/or integrated circuitry, application specific integrated circuitry (ASIC), a field programmable gate array (FPGA), a system-on-a-chip (SOC), and combinations thereof.

Figure 15:
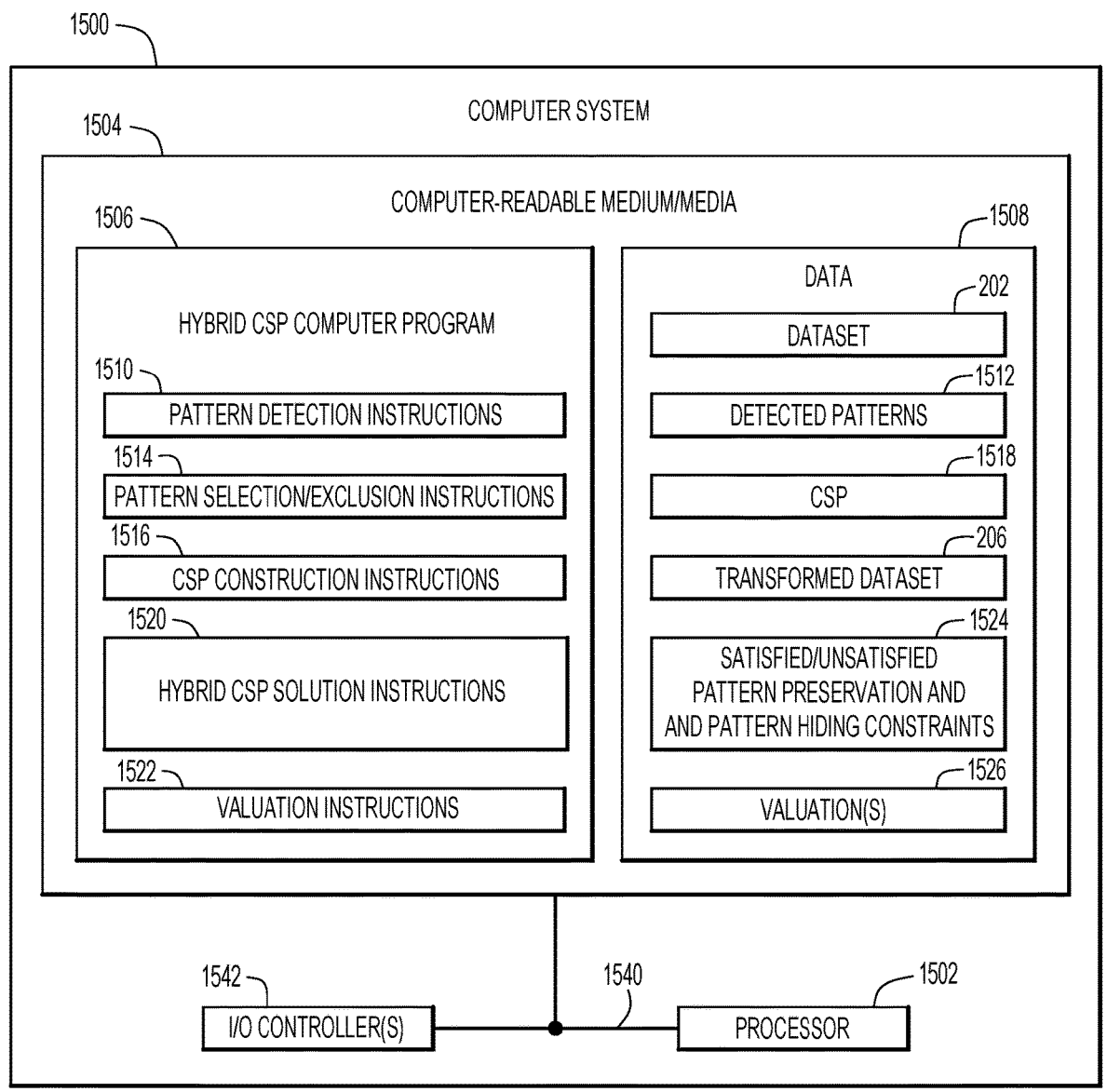
FIG. 15 is a block diagram of a computer system configured to transform a dataset to one in which data is privatized, and in which a first set of patterns remains detectable and a second set of data patterns is undetectable, according to an embodiment of the present invention.

FIG. 15 is a block diagram of computer system 1500, configured to transform a dataset to one in which data is privatized, and in which a first set of patterns remains detectable and a second set of data patterns is hidden or otherwise undetectable. Computer system 1500 may represent an example embodiment of server system 110 in FIG. 1, client system 114 in FIG. 1, and/or apparatus 200 in FIG. 2. Computer system 1500 is not, however, limited to the examples of FIG. 1 or FIG. 2.

Computer system 1500 includes one or more processors, illustrated here as a processor 1502, to execute instructions of a hybrid CSP computer program 1506 encoded within a (non-transitory) computer-readable medium 1504.

Computer-readable medium 1504 further includes data 1508, which may be used by processor 1502 during execution of HCSP computer program 1506, and/or generated by processor 1502 during execution of HCSP computer program 1506.

Processor 1502 may include one or more instruction processors and/or processor cores, and a control unit to interface between the instruction processor(s)/core(s) and computer readable medium 1504. Processor 1502 may include, without limitation, a microprocessor, a graphics processor, a physics processor, a digital signal processor, a network processor, a front-end communications processor, a co-processor, a management engine (ME), a controller or microcontroller, a central processing unit (CPU), a general purpose instruction processor, and/or an application-specific processor.

In the example of FIG. 15, HCSP computer program 1506 includes pattern detection instructions 1510 to cause processor 1502 to detect patterns 1512 of dataset 202, such as described in one or more examples herein.

Computer program 1506 further includes pattern selection/exclusion instructions 1514 to cause processor 1502 to select a first subset of detected patterns 1512 to remain detectable, and a second subset of detected patterns 1512 to be undetectable, such as described in one or more examples herein.

Computer program 1506 further includes CSP construction instructions 1516 to cause processor 1502 to construct a CSP 1518 based on a set of initial constraints (i.e., privacy constraints, pattern preservation constraints, and pattern hiding constraints), an optimization criteria, such as described in one or more examples herein.

Computer program 1506 further includes hybrid CSP solution instructions 1520 to cause processor 1502 to determine a solution of CSP 1518, and to generate transformed dataset 206, such as described in one or more examples herein.

Computer program 1506 further includes valuation instructions 1522 to cause processor 1502 to assign a value to transformed dataset 206 based on satisfied/unsatisfied constraints 1524 of transformed dataset 206, such as described in one or more examples herein.

Computer system 1500 further includes communications infrastructure 1540 to communicate amongst devices of computer system 1500.

Computer system 1500 further includes an input/output (I/O) controller 1542 to communicate between computer system 1500 and another apparatus, device, system, and/or network.

In an embodiment, a value/price is determined for a transformed dataset (possibly in agreement with a purchaser/data user), that is analogous to a sum of the prices of the individual patterns that remain discoverable in the transformed dataset.

A transformed dataset may be useful in support of data monetization initiatives. For example, combining data privacy with knowledge hiding algorithms and pricing models allows generating privatized datasets at a pre-determined price, which can offer exactly the knowledge that is anticipated to be disclosed to third parties (based on business agreements, monetization initiatives, etc.), and nothing more. Therefore, such techniques provide full control to a data owner regarding what information/knowledge is available to third parties.

Methods and systems disclosed herein may be beneficial in a data subscription situation, where additional data can be sold after a subscription based on the PI it will reveal. It can be an upsell opportunity based on the data the client is using.

Considering a particular data mining task, such as data clustering or association rule mining, patterns of a dataset may vary in terms of their expected interestingness for the end-user. Patterns may be prioritized and/or assigned values/prices based on a corresponding measures of interestingness (e.g., perceived value to a potential purchaser). Patterns having a higher priority and/or values/prices, may be selected to remain discoverable in a transformed dataset.

Methods and systems disclosed herein may be useful to control a level of privatized data/knowledge that is made available to users.

Methods and systems disclosed herein are not limited to the specific tasks or algorithms described herein.

Terminology used herein is for the purpose of describing particular embodiments and is not intended to be limiting. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of techniques disclosed herein. Embodiments disclosed herein are chosen and described in order to best explain principles and practical applications, and to enable others of ordinary skill in the art to understand the various embodiments with various modifications as are suited to the particular use contemplated.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Techniques disclosed herein may be implemented or configured as a system, a method, and/or a computer program product at any possible technical detail level of integration. The computer program product may include a computer readable storage medium (or media) having computer readable program instructions thereon to cause a processor to carry out features disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers.

A network adapter card or network interface in each computing/processing device receives computer readable program instructions from the network and forwards the computer readable program instructions for storage in a computer readable storage medium within the respective computing/processing device.

Computer readable program instructions to perform operations disclosed herein may include assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages.

The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Techniques/features are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, in a data processing system comprising at least one processor and at least one memory, the at least one memory comprising instructions executed by the at least one processor to cause the at least one processor to transform a dataset, the method comprising:

identifying discoverable patterns of a dataset and assigning a monetary value to each identified pattern;

determining privacy constraints to privatize the dataset, and pattern constraints to preserve a first set of the patterns and conceal a second set of the patterns;

generating a model based on the privacy constraints, the pattern constraints, and optimization criteria, wherein the model satisfies all of the privacy constraints and a subset of the pattern constraints that do not conflict with the privacy constraints, with minimal loss of data;

applying the model to the dataset to determine changes needed to the dataset to satisfy all of the privacy constraints and the subset of the pattern constraints, wherein the model fails to satisfy at least one of the pattern constraints;

modifying the dataset in accordance with the determined changes, wherein the optimization criteria minimize a distance between the dataset and the modified dataset and the determined changes satisfy the optimization criteria; and determining discoverable patterns of the modified dataset from the subset of privacy constraints, and determining a monetary value of the modified dataset based on the monetary values of the discoverable patterns of the modified dataset.

2. The method of claim 1, wherein the generating a model includes:
formulating a constraint satisfaction problem that includes the privacy constraints, the pattern constraints, and the optimization criteria configured to minimize information loss.

3. The method of claim 2, wherein the generating a model further includes:
selectively replacing items in the dataset with variables of the constraint satisfaction problem, wherein each variable captures a presence or absence of a corresponding item in the modified dataset.

4. The method of claim 2, wherein the generating a model further includes:
identifying a conflict in the model between the privacy constraints and the pattern constraints; and
omitting one or more of the pattern constraints from the constraint satisfaction problem until there is no conflict between the privacy constraints and remaining ones of the pattern constraints.

5. The method of claim 4, wherein the pattern constraints include pattern preservation constraints to preserve the first set of patterns and pattern hiding constraints to conceal the second set of patterns, and wherein the omitting includes:
omitting one or more of the pattern preservation constraints prior to omitting one or more of the pattern hiding constraints.

6. The method of claim 4, wherein the omitting includes:
selecting the one or more of the pattern constraints to omit from the constraint satisfaction problem based on the monetary values assigned to the corresponding patterns.

7. The method of claim 1, wherein the assigning monetary values to the patterns includes:
characterizing the patterns with respect to interestingness; and
assigning the monetary values to the patterns based on the respective characterizations of interestingness.

8. The method of claim 1, wherein the dataset includes medical data fields of patients, and wherein the patterns include patterns of the medical data fields, or personal financial data of a natural person.

9. A computer program product comprising one or more computer readable storage media collectively encoded with a computer program that includes instructions to cause a processor to:
identify discoverable patterns of a dataset and assign a monetary value to each identified pattern;
determine privacy constraints to privatize the dataset, and pattern constraints to preserve a first set of the patterns and conceal a second set of the patterns;
generate a model based on the privacy constraints, the pattern constraints, and optimization criteria, wherein the model satisfies all of the privacy constraints and a subset of the pattern constraints that do not conflict with the privacy constraints, with minimal loss of data;
apply the model to the dataset to determine changes needed to the dataset to satisfy all of the privacy constraints and the subset of the pattern constraints, wherein the model fails to satisfy at least one of the pattern constraints;

modify the dataset in accordance with the determined changes, wherein the optimization criteria minimize a distance between the dataset and the modified dataset and the determined changes satisfy the optimization criteria; and
determine discoverable patterns of the modified dataset from the subset of privacy constraints and determine a monetary value of the modified dataset based on the monetary values of the discoverable patterns of the modified dataset.

10. The computer program product of claim 9, wherein the computer program further includes instructions to cause the processor to:
formulate a constraint satisfaction problem that includes the privacy constraints, the pattern constraints, and the optimization criteria configured to minimize information loss.

11. The computer program product of claim 10, wherein the computer program further includes instructions to cause the processor to:
selectively replace items in the dataset with variables of the constraint satisfaction problem, wherein each variable captures a presence or absence of a corresponding item in the modified dataset.

12. The computer program product of claim 10, wherein the computer program further includes instructions to cause the processor to:
identify a conflict in the model between the privacy constraints and the pattern constraints; and
omit one or more of the pattern constraints from the constraint satisfaction problem until there is no conflict between the privacy constraints and remaining ones of the pattern constraints.

13. The computer program product of claim 12, wherein the pattern constraints include pattern preservation constraints to preserve the first set of patterns and pattern hiding constraints to conceal the second set of patterns, and wherein the computer program further includes instructions to cause the processor to:
omit one or more of the pattern preservation constraints prior to omitting one or more of the pattern hiding constraints.

14. The computer program product of claim 12, wherein the computer program further includes instructions to cause the processor to:
select the one or more of the pattern constraints to omit from the constraint satisfaction problem based on the monetary values assigned to the corresponding patterns.

15. An apparatus, comprising, a processor and memory configured to:
identify discoverable patterns of a dataset and assign a monetary value to each identified pattern;
determine privacy constraints to privatize the dataset, and pattern constraints to preserve a first set of the patterns and conceal a second set of the patterns;
generate a model based on the privacy constraints, the pattern constraints, and optimization criteria, wherein the model satisfies all of the privacy constraints and a subset of the pattern constraints that do not conflict with the privacy constraints, with minimal loss of data;
apply the model to the dataset to determine changes needed to the dataset to satisfy all of the privacy constraints and the subset of the pattern constraints, wherein the model fails to satisfy at least one of the pattern constraints;

modify the dataset in accordance with the determined changes, wherein the optimization criteria minimize a distance between the dataset and the modified dataset and the determined changes satisfy the optimization criteria; and determine discoverable patterns of the modified dataset from the subset of privacy constraints and determine a monetary value of the modified dataset based on the monetary values of the discoverable patterns of the modified dataset.

16. The apparatus of claim 15, wherein the processor and memory are further configured to:

formulate a constraint satisfaction problem that includes the privacy constraints, the pattern constraints, and the optimization criteria configured to minimize information loss.

17. The apparatus of claim 16, wherein the processor and memory are further configured to:

selectively replace items in the dataset with variables of the constraint satisfaction problem, wherein each variable captures a presence or absence of a corresponding item in the modified dataset.

18. The apparatus of claim 16, wherein the processor and memory are further configured to:

identify a conflict in the model between the privacy constraints and the pattern constraints; and omit one or more of the pattern constraints from the constraint satisfaction problem until there is no conflict between the privacy constraints and remaining ones of the pattern constraints.

19. The apparatus of claim 18, wherein the pattern constraints include pattern preservation constraints to preserve the first set of patterns and pattern hiding constraints to conceal the second set of patterns, and wherein the processor and memory are further configured to:

omit one or more of the pattern preservation constraints prior to omitting one or more of the pattern hiding constraints.

20. The apparatus of claim 18, wherein the processor and memory are further configured to:

select the one or more of the pattern constraints to omit from the constraint satisfaction problem based on the monetary values assigned to the corresponding patterns.

\* \* \* \* \*